April 9, 1935.  T. F. CULLINAN  1,997,107
GAS TANK LOCKING MECHANISM
Original Filed Nov. 25, 1933  3 Sheets-Sheet 2
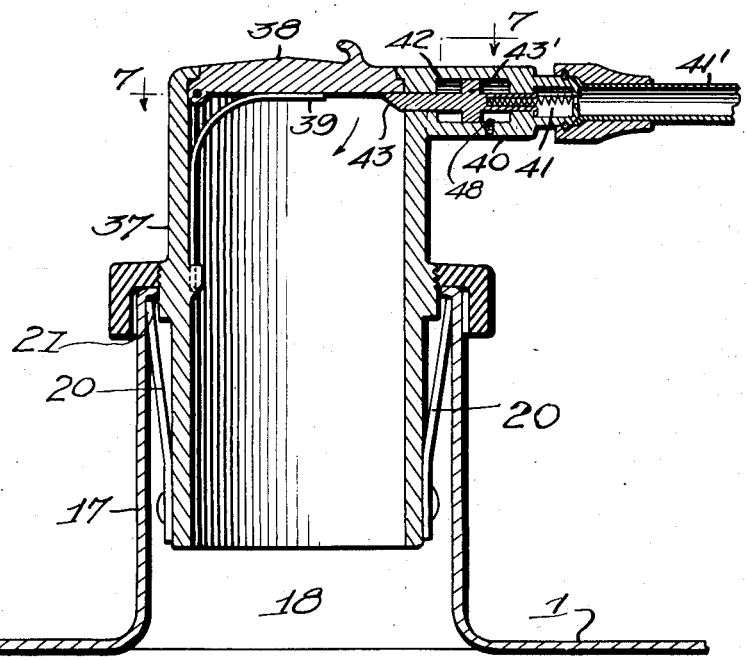
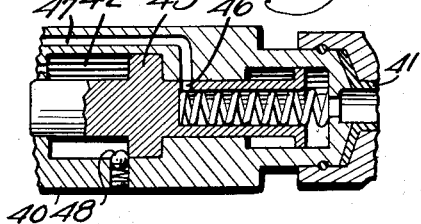
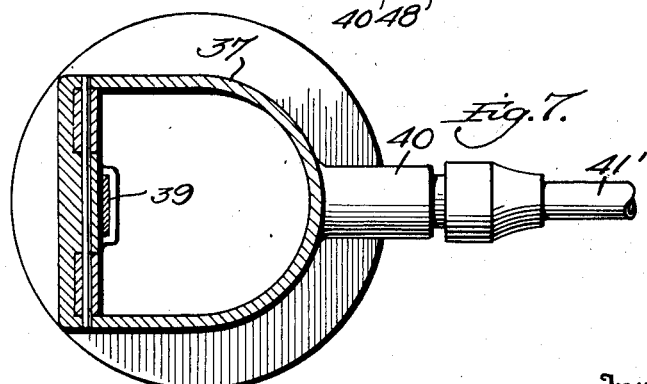
Inventor
THOMAS F. CULLINAN
By
Attorney April 9, 1935.  T. F. CULLINAN  1,997,107
GAS TANK LOCKING MECHANISM
Original Filed Nov. 25, 1933   3 Sheets-Sheet 3
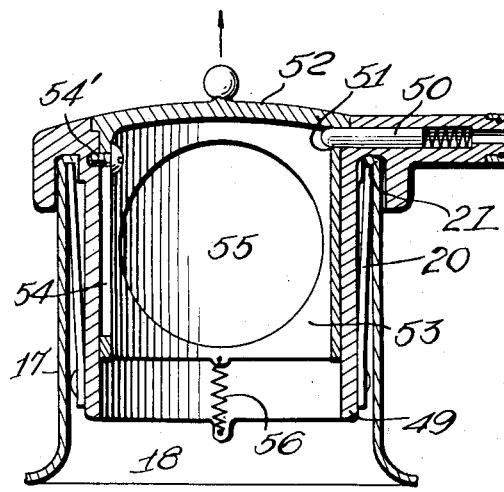
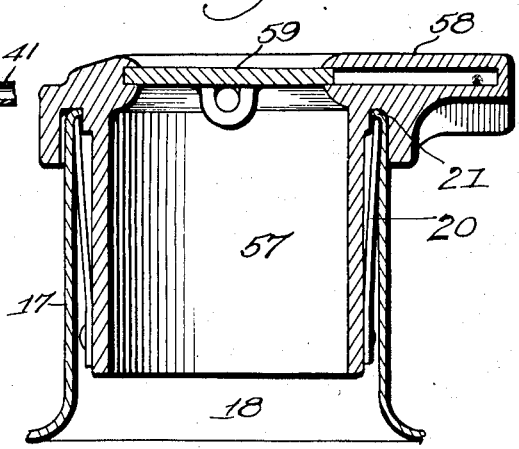
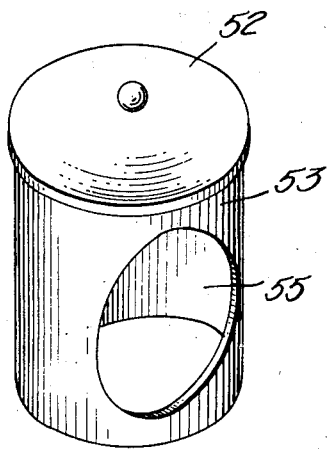
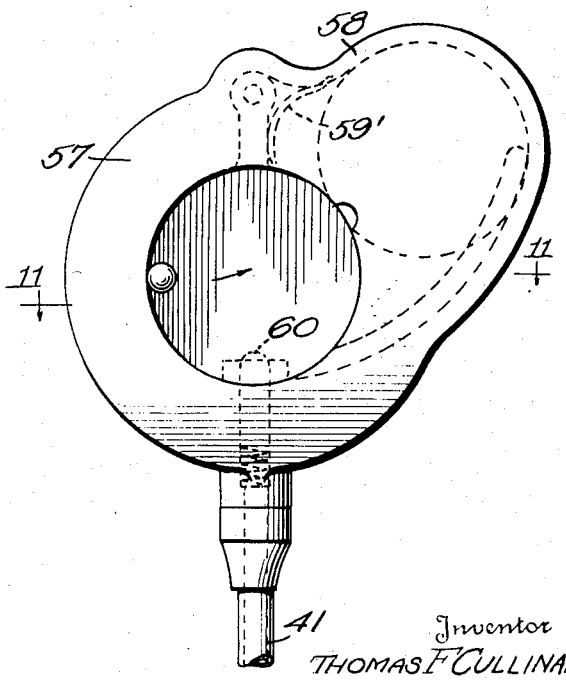
Inventor
THOMAS F. CULLINAN
By
Attorney Patented Apr. 9, 1935

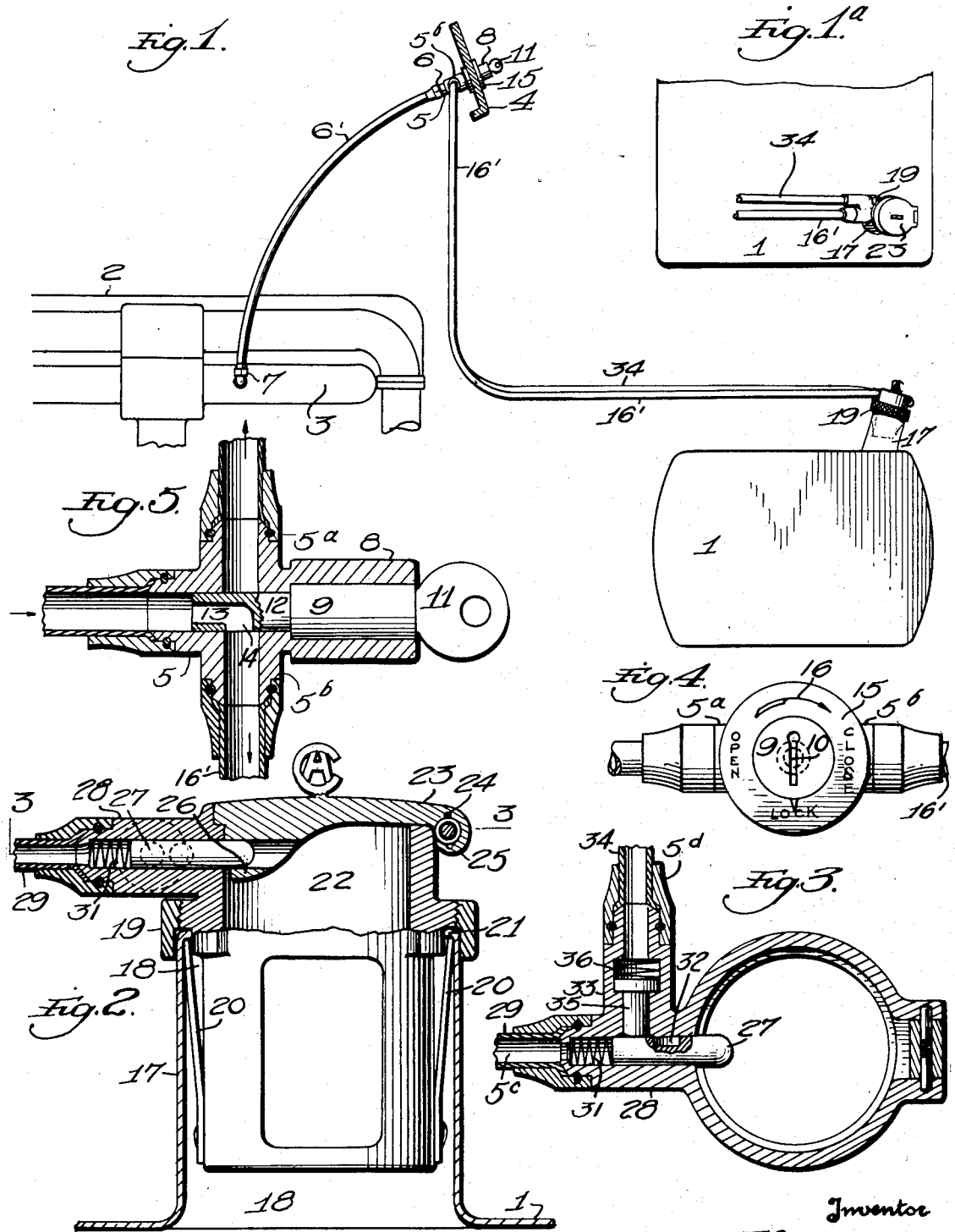

1,997,107

UNITED STATES PATENT OFFICE 1,997,107

GAS TANK LOCKING MECHANISM

Thomas F. Cullinan, Johnson City, Tenn.

Application November 25, 1933, Serial No. 699,715
Renewed February 23, 1935

8 Claims. (Cl. 70—90)

My invention relates to improvements in gas tank locking mechanisms, and refers particularly to a mechanism for locking the cover of the filling opening of the gas tank of an automobile, although the invention is not limited to this use.

One object of my invention is the provision of a mechanism which will be under the control and operation of the driver of the vehicle and which will permit the release of the cover to permit filling of the gas tank and the locking of the cover without requiring the driver to leave the vehicle.

Another object of my invention is the provision of a mechanism of the character and for the purpose stated which will not mar or detract from the appearance of the vehicle upon which it is applied and which may be easily attached to vehicles in general use at the time of their manufacture.

Another object of my invention is the provision of a cover locking mechanism which will comprise few parts to insure simplicity, durability and inexpensiveness of production; which will be reliable and efficient in its operation and which generally in every particular will prove practical, useful and highly desirable.

With these objects in view my invention consists in a cover locking mechanism for gas tanks embodying novel features of construction and combination of parts, substantially as described and claimed and as shown in the accompanying drawings, in which:

Figure 1 represents a view in side elevation of the complete cover locking mechanism showing its application to the tank cover, vehicle and manifold of the engine.

Figure 1a represents a detail view showing the lead connections from the cover locking mechanism to the key controlled mechanism mounted on the dash board of the automobile.

Figure 2 represents a vertical central sectional view on an enlarged scale of the main elements comprising the locking mechanism showing the cover in normal or locked position.

Figure 3 represents a sectional view taken on the line 3—3 of Figure 2, the cover being open.

Figure 4 represents a face view or elevation of the key operated mechanism mounted on the dash with the twin tubes or connections and couplings.

Figure 5 represents a horizontal sectional view of the three way coupling, the three tubes or connections associated with said coupling and the key operated means mounted in said coupling member.

Figure 6 represents a vertical central sectional view of a modified form of my invention.

Figure 7 represents a view on line 7—7 of Figure 6.

Figures 8 and 9' represent sectional views of the locking mechanism showing the locking bolt in locked position and also in released or unlocked position, respectively.

Figure 9 represents a vertical central sectional view of another modified form of my invention, and Figure 10 represents a perspective view of the tubular cover member used in this form of my invention.

Figure 11 represents a central sectional view of another modification of my invention, and Figure 12 represents a top plan view of this form of the mechanism.

Referring by numeral to the drawings in which the same numbers of reference denote like parts in all the views:

The numeral 1 designates the gas tank, 2 the motor or engine, 3 the manifold and 4, the dash board which parts are used in connection with my mechanism for locking the cover of said tank.

Mounted upon the dash board is the three way coupling member having its central and intermediate nipple 5, receiving the upper end 6, of the pipe or connection 6', and its lower end 7, in communication with the manifold.

From this construction it will be noted that air is drawn from the pipe 6', to and from the nipple 5, of the three way coupling to the pair of lateral nipples 5a, and 5b, of said coupling, and mounted in said centrally arranged inward extending tubular lug 8, formed on the three way coupling is the rotary member 9, having a key slot 10, to receive the key 11, while said member is formed with the reduced round end 12, which is formed with the passage 13, leading to the outlet 14, and upon turning the rotary member the outlet 14, is brought into register with either of the lateral nipples 5a or 5b, as will appear in due time.

The said tubular boss or lug is provided upon its face or upon a flat ring 15, with a directional arrow 16, and with the words "open", "close", and "lock", to indicate to the driver the position of the outlet 14 in its relation to the said pair of lateral nipples of the three way coupling.

From this construction it will be noted that the single element forms a three way coupling and also a mounting for the key and the reduced end or valve 12, and from the nipple 5a of said coupling leads the pipe or tube 16, while from the nipple 5b, leads the pipe or tube 16', as most clearly shown in Figures 1 and 1a, whose purpose will presently appear.

The gas tank is provided with a neck portion 17, around its filling opening 18, and mounted in said neck is the tubular cover carrying member 19, which is retained in place by the series of spring tongues or latches 20, which have their upper ends retained by the annular flange 21, around the upper edge of said neck portion.

In the mouth portion 22 of the cover carrying element or member is hinged the cover 23, and a spring 24, is arranged in connection with the hinge 25, to open or raise the cover when its keeper 26, releases the locking bolt 27, which is slidingly mounted in the nipple 28, which is in communication with the lower end 5c, of the tube 29, whose upper end 30, is in communication with the nipple 5a, and the locking bolt is forced into locking position by the spring 31, and is also provided with the recess 32, whose purpose will presently appear.

Formed integral with the nipple 28, and at a right angle thereto is the nipple 33, which is in communication with the lower end 5d, of the tube 34, and from this construction it will be noted that air drawn into the manifold passes from the tube 6', and from either of the nipples 5a or 5b, of the three way coupling and from the pipe 29, to allow the atmospheric pressure to act upon the locking bolt 27, or from the tube 34, to allow atmospheric pressure to act upon the sliding catch 35, forced by spring 36, to move said catch into recess 32, of the locking bolt and retain said locking bolt from engagement with the keeper 26, of the cover 23, as shown clearly in Figure 3.

From the construction described taken in connection with the drawings it will be apparent that the cover is normally retained in closed and locked position by the locking bolt and that when necessary to fill the tank the locking bolt is first withdrawn, then the catch engages the locking bolt and holds it in withdrawn position and allows the tank to be filled, and when this has been accomplished the cover of the tank is closed, the sliding bolt is released and under the action of the spring moves in position to lock said cover, the catch having been first withdrawn to allow operation of the locking bolt.

The operation and control of the mechanism is effected by the driver without the necessity of leaving the vehicle, as the connection from the manifold allows the withdrawal of the air and the manipulation of the key allows the said air to be drawn from the connection to the locking bolt to allow atmospheric pressure to withdraw said bolt and allow the cover to be raised and then to the safety catch to retain the locking bolt 27 until the tank has been filled and when this has been accomplished the key is moved to original position and the parts are returned to normal position.

In the modified form of my invention shown in 6, 7, 8 and 8', the tubular cover carrying member 37, is provided with a hinged cover 38, which moves inwardly as shown by the arrow, to allow filling of the tank and a flat spring 39, is provided to return the cover to closed position, and in this form of my invention the cover carrying member is provided or formed with an extension 40, formed with a chamber 41, to which leads the air conducting pipe 41', and with an enlarged chamber 42, which houses the working parts of the locking means.

The locking bolt 43, in this form of my invention slides under the cover and is provided with the intermediate plunger or piston 43' which slides in the chamber 42, and is also provided with the hollow tubular portion 44, which forms the cavity for the impelling spring 45, and said hollow tubular portion is further provided with an opening 46, leading to the port or passage 47, from which the air is exhausted to allow atmospheric pressure to force the plunger and locking bolt inward to unlock the cover, and when the locking bolt is withdrawn the spring catch 48, engages the plunger and holds the bolt in position.

It will be apparent that atmospheric pressure first forces the locking bolt back and then after the tank has been filled atmospheric pressure effects the return of the bolt, and this operation is clearly shown in Figures 8 and 8a.

In the modified form of my invention shown in Figures 9 and 10, the cover member 49, is provided with a spring acting locking bolt 50, which engages an opening 51, in the vertically movable cover 52, having the sleeve 53, guided by the slot 54 and stud 54', such sleeve being formed with an opening 55, to receive the filling spout and being further connected at its lower edge with a spring 56, also connected with the cover carrying member.

In the modified form of my invention shown in Figures 11 and 12, the cover carrying member 57, is provided at its upper edge with a lateral hollow extension 58, into which the cover 59, may be slid or moved to open position, and in this form a flat spring 59', is used to return the cover and the spring actuated locking bolt 60, is used and operated in the same manner as in the other forms of my invention.

I have shown in the drawings constructions of mechanisms for locking the cover of the gasoline tank of an automobile which embody what I believe to be practical means for effecting the objects of this invention, but I would have it understood that I reserve the right to make any changes, alterations, or additions to my invention as fall within the scope of my invention as defined by the claims.

I claim:

1. A gas tank cover locking mechanism, comprising a cover carrying member, a cover mounted on said member, a locking mechanism for retaining said cover in locked position, means for withdrawing said cover locking mechanism, means for retaining said locking mechanism in such withdrawn position, said locking and locking mechanism retaining means being disposed in right angled relation, springs associated with said locking and retaining means to return them to normal position and means for releasing said retaining and locking mechanism to allow said locking means to return to locked position.

2. In a gas tank cover locking mechanism, the combination of a gas tank having a neck around its filling opening, a cover carrying member mounted in said neck, a hinged cover carried by said member, a right angled extension on said cover carrying member forming a pair of nipples, a spring locking bolt in one of said nipples, a spring safety catch in the other nipple to hold said locking bolt when withdrawn from locking engagement with said cover, and air pressure means in communication with the manifold for actuating said locking bolt and safety catch.

3. A gas tank locking mechanism, comprising a tank having a neck around its filling opening, a cover carrying member mounted in said neck, a cover on said member, a locking mechanism in the cover carrying member for engaging and locking the cover when closed, atmospheric pressure operated means for withdrawing the locking means to allow opening of the cover, and atmospheric pressure operated latching means to hold the said locking means in inoperative position.

4. A gas tank locking mechanism, comprising a tank having a raised neck around its filling opening, a cover carrying member fitted in said neck, a cover carried by said member, a cover locking mechanism disposed on one side of said member at its upper edge, a spring for forcing said locking mechanism into engagement with the cover, atmospheric pressure means for withdrawing the locking means to allow opening of the cover, and atmospheric pressure operated latching means to hold said cover locking means in inoperative position.

5. A gas tank locking mechanism, comprising a tank having a filling opening, a cover carrying member mounted in said filling opening, a cover carried by said member, a two way nipple extending from the said member, a locking bolt in one branch of said nipple, atmospheric pressure operated means for withdrawing said locking bolt to allow opening of the cover, and atmospheric pressure operated means in the other branch of said two way nipple for holding said locking bolt in withdrawn position while the cover is in open position.

6. A gas tank locking mechanism, comprising a tank having a filling opening, a cover carrying member mounted in said opening, a cover carried by said member, a pair of nipples projecting from said cover carrying member in right angled relation, a cover locking bolt in one of said nipples to engage the underside of the cover and hold it in locked position, a latch in the other nipple adapted to engage said locking bolt and hold it when withdrawn, and atmospheric pressure operated means for releasing said locking bolt and catch.

7. A gas tank locking mechanism, comprising a tank having a filling opening, a cover carrying member mounted in said filling opening, a cover carried by said member, a pair of nipples carried by said member, a locking bolt in one of said nipples provided with a recess, a spring for normally forcing said bolt into locking engagement with the cover, a latch in the other nipple for engaging the recess of the locking bolt when in withdrawn position, a spring for forcing said latch into engagement with said recess, and atmospheric pressure operated means for actuating said locking bolt and latch.

8. In an atmospheric pressure operated lock, an atmospheric pressure operated bolt, an atmospheric pressure operated catch for the bolt, spring means for projecting the bolt, spring means for projecting the catch to effect engagement with said bolt, a conduit through which pressure can be relieved behind the bolt, a conduit through which pressure can be relieved behind the catch, and a three way key operated valve for connecting either of the two conduits with an evacuating means.

THOMAS F. CULLINAN.